US008887298B2

(12) United States Patent
Reid

(10) Patent No.: US 8,887,298 B2
(45) Date of Patent: Nov. 11, 2014

(54) UPDATING AND VALIDATING DOCUMENTS SECURED CRYPTOGRAPHICALLY

(75) Inventor: Colin Wilson Reid, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1602 days.

(21) Appl. No.: 11/777,298

(22) Filed: Jul. 13, 2007

(65) Prior Publication Data

US 2009/0019549 A1   Jan. 15, 2009

(51) Int. Cl.
*G06F 7/04* (2006.01)
*H04L 9/32* (2006.01)

(52) U.S. Cl.
CPC ........... *H04L 9/3247* (2013.01); *H04L 2209/80* (2013.01); *H04L 2209/60* (2013.01)
USPC .............. 726/27; 713/165; 713/170; 713/180

(58) Field of Classification Search
None
See application file for complete search history.

(56) References Cited

U.S. PATENT DOCUMENTS

| | | | |
|---|---|---|---|
| 5,974,238 A | 10/1999 | Chase, Jr. | |
| 6,389,423 B1 | 5/2002 | Sakakura | |
| 6,505,200 B1 | 1/2003 | Ims et al. | |
| 6,732,277 B1 | 5/2004 | Vandergeest et al. | |
| 6,757,896 B1 | 6/2004 | Cohen et al. | |
| 6,928,467 B2 | 8/2005 | Peng | |
| 7,134,020 B2 | 11/2006 | Eagle et al. | |
| 7,353,397 B1 * | 4/2008 | Herbach ........................ | 713/176 |
| 2002/0006212 A1 | 1/2002 | Rhoads et al. | |
| 2003/0005306 A1 | 1/2003 | Hunt et al. | |
| 2003/0120685 A1 | 6/2003 | Duncombe et al. | |
| 2004/0172423 A1 | 9/2004 | Kaasten et al. | |
| 2005/0050363 A1 | 3/2005 | Naka et al. | |
| 2005/0055698 A1 | 3/2005 | Sasaki et al. | |
| 2005/0137895 A1 | 6/2005 | Whitlock et al. | |
| 2005/0138211 A1 | 6/2005 | Cheng | |
| 2007/0038688 A1 | 2/2007 | Morrill et al. | |

FOREIGN PATENT DOCUMENTS

| | | | |
|---|---|---|---|
| IL | WO02082281 A2 | 10/2002 | |
| JP | 2005-332010 A | 12/2005 | |
| WO | WO2004/077269 A2 | 9/2004 | |

OTHER PUBLICATIONS

Requena, "An Implementation of the Server Cache Synchronisation Protocol (SCSP)", Mar. 1999, pp. 79.
Scott, et al., "Haggle: A Networking Architecture Designed Around Mobile Users", 2006, pp. 9.
Young, "Expanding Network-Portable Access to Remote Computing Resources", May 2003, David Young, University of Queensland, 2003, pp. 62.
Chinese Voluntary Amendments, Application No. 200680051587.2, dated May 20, 2009, 9 pages.

(Continued)

*Primary Examiner* — Kaveh Abrishamkar
(74) *Attorney, Agent, or Firm* — Nicholas Chen; Kate Drakos; Micky Minhas

(57) ABSTRACT

Aspects of the subject matter described herein relate to updating and validating documents secured cryptographically. In aspects, documents are encrypted to protect them from unauthorized access. An entity having write access to a document may create a new version of the document and sign the new version with a private key. Other entities may validate that the new version of the document was created by an authorized entity by using a public key available in security data associated with the version. The entities that are authorized to create a new version may change which security principals are allowed to create subsequent versions.

33 Claims, 8 Drawing Sheets

(56) References Cited

OTHER PUBLICATIONS

Chinese First Office Action, Application No. 200680051587.2, dated Jul. 24, 2009, 8 pages.
Response to Chinese First Office Action, Application No. 200680051587.2, dated Dec. 1, 2009, 15 pages.
Chinese Second Office Action, Application No. 200680051587.2, dated Apr. 13, 2010, 12 pages.
Response to Chinese Second Office Action, Application No. 200680051587.2, dated May 31, 2010, 3 pages.
Chinese Patent Application No. 200880024439.0, Office Action dated Aug. 24, 2011, 7 pages.
Chinese Patent Application No. 200880024439.0, Response Office Action dated Dec. 30, 2011, 12 pages.
Office Action, Russian Patent Application No. 2010100883, dated Jun. 6, 2012, 6 pages.
International Search Report and Written Opinion Received for PCT Application No. PCT/US2008/069847, mailed on Feb. 13, 2009, 11 pages.

\* cited by examiner

FIG. 4

| Document Version Data Structure — 400 | |
|---|---|
| Document Identifier | 405 |
| Security Data Identifier | 410 |
| Timestamp | 415 |
| Encrypted Data | 420 |
| Update Signature | 425 |
| Observer Signature | 426 |

| Security Data Structure — 427 | |
|---|---|
| Security Data Identifier | 430 |
| Prior Security Data Identifier | 435 |
| Authorization(s) | 440 |
| Usage Options | 445 |
| Key(s) | 450 |
| Signature(s) | 455 |

UPDATING AND VALIDATING DOCUMENTS SECURED CRYPTOGRAPHICALLY

BACKGROUND

Granting access to user data is typically performed programmatically. That is, an operating system or web service grants access to the data based on access rights of the user. This model is not very secure, particularly when the user grants access to many other entities. If the security of any entity having access to the data is compromised, the user's data may be accessed and maliciously changed or corrupted without the user's permission or knowledge. The more entities that are involved in handling a user's data, the less secure the data is.

SUMMARY

Briefly, aspects of the subject matter described herein relate to updating and validating documents secured cryptographically. In aspects, documents are encrypted to protect them from unauthorized access. An entity having write access to a document may create a new version of the document and sign the new version with a private key. Other entities may validate that the new version of the document was created by an authorized entity by using a public key available in security data associated with the version. The entities that are authorized to create a new version may change which security principals are allowed to create subsequent versions.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

BRIEF DESCRIPTION OF THE DRAWINGS

FIG. 4 illustrates some exemplary data structures that may be used in conjunction with aspects of the subject matter described herein;

DETAILED DESCRIPTION

Exemplary Operating Environment

Figure 1:
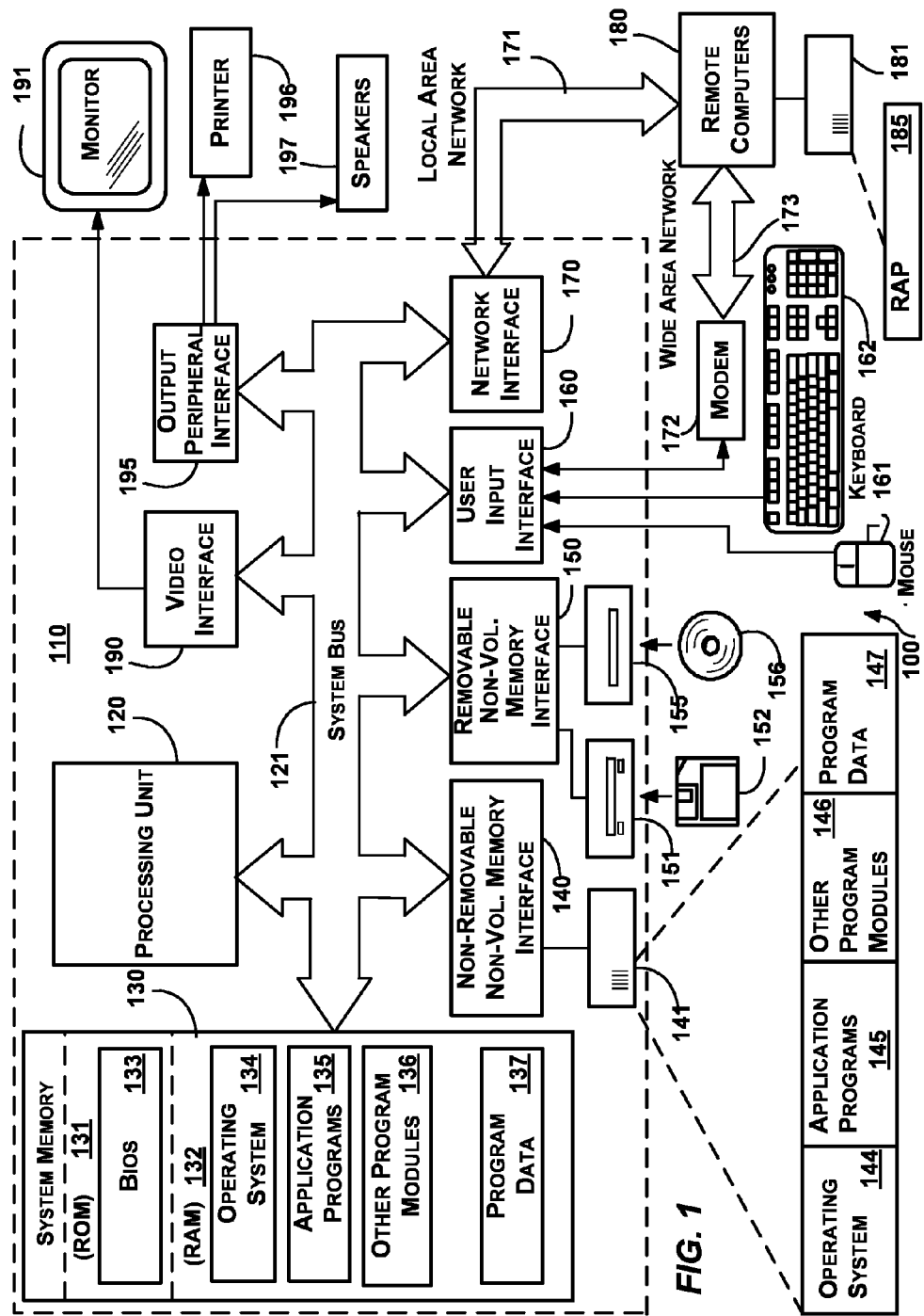
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Updating and Validating Documents

Figure 2:
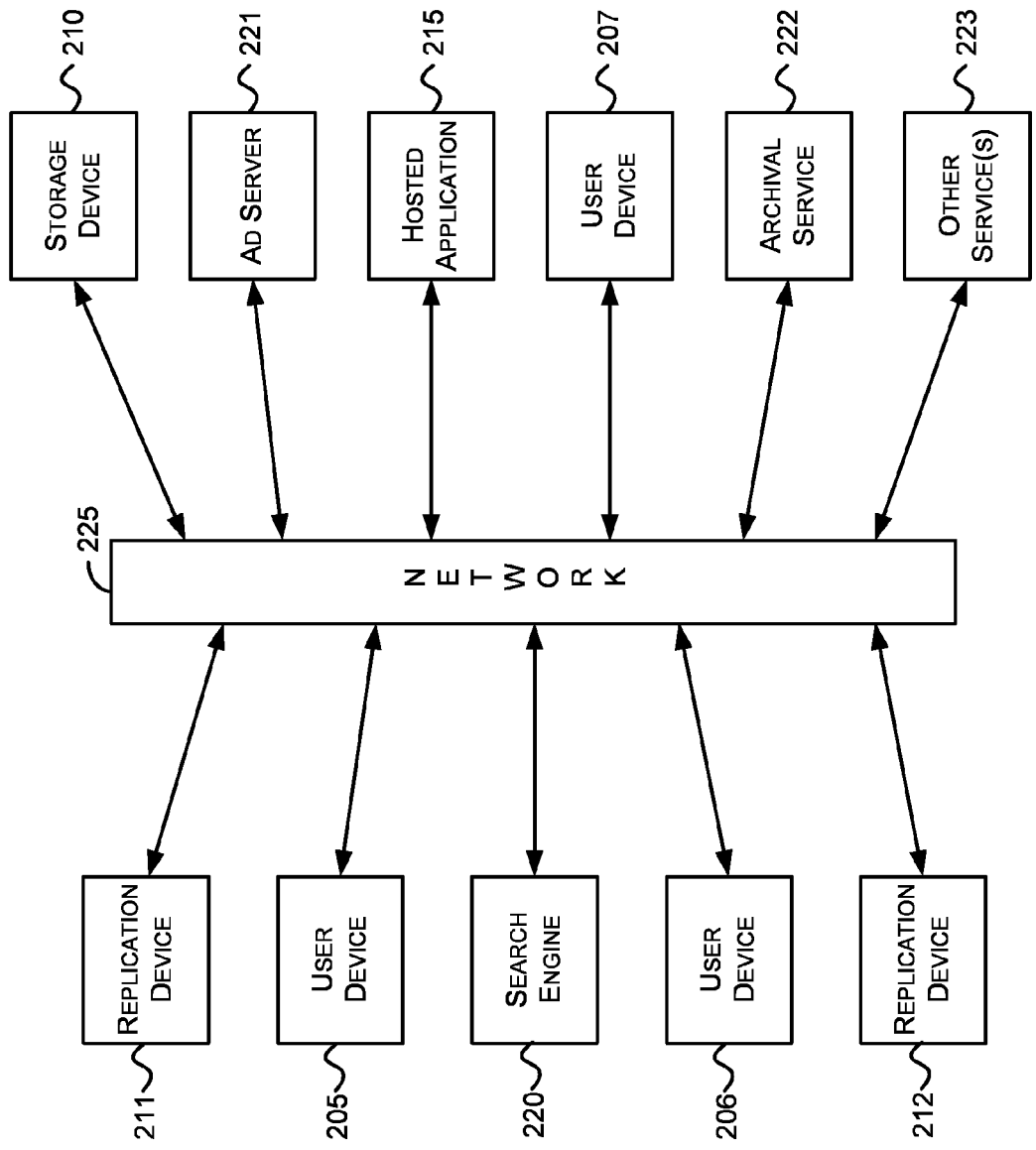
FIG. 2 is a block diagram that generally represents an exemplary environment in which aspects of the subject matter described herein may operate.

FIG. 2 is a block diagram that generally represents an exemplary environment in which aspects of the subject matter described herein may operate. The environment includes user devices 205-207, storage devices 210-212, a hosted application 215, services 220-223, and a network 225.

A user may use a user device 205 to store data on the storage device 210. The user data may then be accessed by the user devices 205-207, the services 220-223, and the hosted application 215. The user data may also be replicated on the replication devices 211-212.

The user devices 206 and 207 may be operated by the user who stored the data or may be operated by other users to whom the user has given access rights to the data. For example, a user may have a computer (e.g., user device 205) at work with which the user stores the data on the storage device 210. At home, the user may have another computer (e.g., user device 206) with which the user accesses the data. A user may also have a cell phone or other electronic device (e.g., user device 207) with which the user accesses the data. When a user is traveling, the user may access the data via a computer the user takes with him or via another computer or electronic device the user is able to use.

As mentioned previously, the user may desire to have other users have access to the data and may grant the other users such access. These users may use computers or other electronic devices (e.g., user devices 206 and 207) to access the data according to their access rights.

The user may desire to access the data via a hosted application 215. The user may access the hosted application 215 via a web browser, for example, and may then access the data via the hosted application 215.

The user may desire to have certain services have access to the user's data. For example, the user may wish to have an ad server 221 access the user's data to provide relevant ads to the user or others. The user may desire to have a search engine 220 have access to the user's data to allow others to find the user's data. The user may desire to have an archival service 222 have access to the data to create archival backups of the data. The user may also desire to have other services 223 have access to the data for various purposes.

An entity may include a physical device, process, service, machine, user, key, component, multiple of one or more of the above, and the like. The user may desire each entity with access to the user data be given a certain set of access rights that may vary from entity to entity. For example, the user may desire an archival service to be able to copy the data but not to be able to read the data in a meaningful way or to modify the data. Being able to copy the data without reading it in a meaningful way or modifying it is sometimes referred to as "copy-only" access. As another example, the user may desire to have the ad server 221 and the search engine 220 be able to read the data but not be able to write to the data. The user may desire to have some colleagues have read/write access to the data while other business associates have read access or copy-only access to the data.

The network 225 represents any mechanism and/or set of one or more devices for conveying data from one entity to another and may include intra- and inter-networks, the Internet, phone lines, cellular networks, networking equipment, direct connections between devices, wireless connections, and the like. The user may desire to have devices of the network 225 be able to copy the data to transmit it to other entities but not to be able to change the data or read it in a meaningful way.

Examples of the devices (e.g., devices 205-207 and 210-212) include cell phones, text messaging devices, smart phones, networking devices, the special and general purpose electronic devices as described in conjunction with FIG. 1, combinations, portions, or variations of the above, and the like.

As will be recognized by those of skill in the art, having many entities handling or having access to the data makes it more difficult to keep the data secure and to ensure that the data is not corrupted or updated maliciously.

Figure 3:
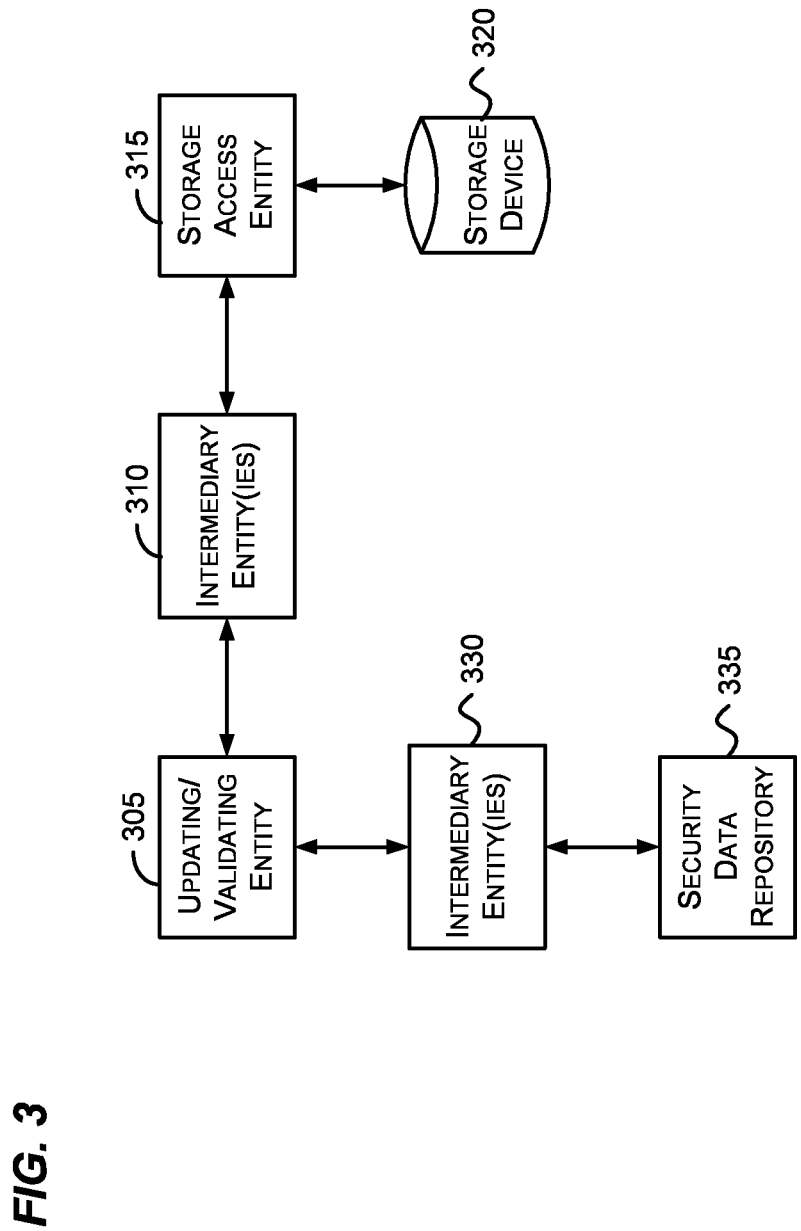
FIG. 3 is a block diagram that generally represents an exemplary set of entities that may participate in modifying or validating a document according to aspects of the subject matter described herein.

FIG. 3 is a block diagram that generally represents an exemplary set of entities that may participate in modifying or validating a document according to aspects of the subject matter described herein. The entities include the updating/validating entity 305, zero or more intermediary entities 310 and 330, a storage access entity 315, a storage device 320, and a security data repository 335.

In one embodiment, the updating/validating entity 305 is an electronic device such as a computer and the intermediary entities 310 and 330 are zero or more networking devices, servers, or other devices that are between the updating/validating entity 305 and the storage access entity 315 and/or the security data repository 335. The storage access entity 315 is the device that is capable of accessing the storage device (e.g., the storage device 320) upon which a requested document is stored.

Document as used herein includes any set of bits of any length that are capable of being stored on a storage device. As will be discussed in further detail in conjunction with FIG. 4, a version of a document may include a document identifier, a security data identifier, and encrypted data among other data. The document identifier uniquely identifies the document in a particular namespace. The security data identifier may be used to retrieve security data pertaining to the document. The encrypted data may include, for example, content that a user wishes to secure such as a word processing file, a spreadsheet, other data, cryptographic keys that may be used to decrypt other data, or any other data important to a user.

Because the data is encrypted, it can only be meaningfully read by someone who has a key for decrypting the data. As will be discussed in further detail below, keys are kept in security data in a security data repository. With the appropriate key, a user may update a document and security data in a manner such that other entities are able to verify that the user was authorized to update the document and security data.

The storage device 320 is any computer-readable medium capable of storing data and may include distributed file systems, for example. Some exemplary computer-readable media that are suitable for the storage device 320 have been described above in conjunction with FIG. 1.

The security data repository 335 stores security data pertaining to the documents stored on the storage device 320. The security data repository 335 may include one device or several devices that work in concert with each other. The security data repository 335 may include a security data record for each version of a document. The updating/validating entity 305 may request a security data record corresponding to a retrieved document by sending a security data identifier included in the document to the security data repository 335 and requesting the security data identified thereby.

In one embodiment, the security data may be stored in the document itself. In this embodiment, the updating/validating entity 305 may obtain the security data directly from the document.

In one embodiment, one or more of the entities 305, 310, 315, and 330 may be one or more processes or components that execute on one or more devices. In one embodiment, the storage device 320 and/or the security data repository 335 may be devices included in or attached to the device upon which the updating/validating entity 305 executes. Documents stored in the storage device 320 may be placed there by a user of the device upon which the updating/validating entity 305 executes, from another device, or may be placed there by a file replicating infrastructure, for example.

As can been seen, in an exemplary operating environment described above in conjunction with FIG. 3, a document may pass through many entities in route to and from the entities that seek to access to the document. Encrypting the data of the document allows the data to be securely stored on any storage device and in any configuration of devices.

FIG. 4 illustrates some exemplary data structures that may be used in conjunction with aspects of the subject matter described herein. A document version data structure (e.g., document version data structure 400) may be stored for each version of a document. Each document version data structure 400 may include various fields including a document identifier 405, a security data identifier 410, a timestamp 415, encrypted data 420, an update signature 425, and an observer signature 426.

The document identifier 405 may be used to uniquely identify a document in a given namespace. For example, a uniform resource identifier (URI) having an http-like syntax (e.g., live://alice/users/file1.txt) may be used to identify documents in a given namespace. As another example, a globally unique identifier (GUID) may be used to identify documents in a given namespace.

The security data identifier 410 may be used to identify security data associated with the document. In one embodiment, the security data identifier 410 is a hash of one or more other fields in the security data structure 427. A hash takes input data and calculates output data whose length is fixed and does not vary based on the length of the input data. Given output data of a sufficient length and a suitable hash, the hash effectively provides a unique identifier for the input data.

The timestamp field 410 may include a timestamp that indicates when the version was created. As discussed previously, the encrypted data field 420 may include any content that the user wishes to secure.

The update signature field 425 comprises any one or more mechanisms that may be used to ensure that the document version data structure 400 was created by an authorized user and has not changed since creation. One exemplary mechanism is a signature as described in more detail below.

The observer signature field 426 includes the signature of an entity. At times it may be beneficial to have a third party add a signature to a document. For example, as group membership may change over time, it may be desirable to have a third party sign to indicate that at the time the update was made, an entity with a member key was part of the group. As another example, in file replication systems, it may be desirable to have a certain document version marked as authoritative. For example, multiple entities may create new versions of a document between synchronization of the document. It may be desirable to indicate which new version should be replicated and which versions should be dropped when synchronizing the document between replication partners.

An entity that is authorized to provide this signature is sometimes referred to as an observer. To create a signature, the observer may be given a hash of the fields of the document as updated. The observer may create a signature using the observer's private key and the hash. The observer may then return the signature which is then stored in the document. The document or the security data associated with the document may include the public key of the observer. This public key may be used to verify that the observer has signed the update.

In another embodiment, the observer may be given the document itself. If the observer determines that it should sign the document (e.g., through whatever rules and checks it makes), it adds a signature to the document. The document may then be returned with the included signature to the entity that sent it to the observer.

During validation, it may be determined that an observer signature was needed when the new document was created. If so, the signature may be verified by obtaining its public key portion from the security data or document version, for example.

The document version data structure 400 may include more or fewer fields as long as it includes a mechanism for identifying or including security data pertaining to the document and a mechanism for ensuring that the document version was created by an authorized user and has not changed since creation.

The security data structure 427 may include a security data identifier field 430, a prior security data identifier field 435, one or more authorization fields 440, one or more keys 450, and a signature 455. In one embodiment, the security data identifier in the security data identifier field 430 may be calculated as described previously (i.e., as a hash of the other fields of the security data structure 427).

The prior security data identifier field 435 may include an identifier of a security data structure associated with a previous version of a document (if there was one). The prior security data identifier may be used to validate whether a version was created by a security principal (sometimes referred to as an "entity") authorized to create new versions as described below in more detail in conjunction with FIG. 5B.

The authorization fields 440 include an authorization for each security principal that is to have access to or some other role with respect to the document version data structure 400. In some embodiments, a security principal is an entity that can be positively identified and verified via a technique known as authentication. In other embodiments, a security principal may comprise a key decrypted from the security data associated with another document. A security principal may include a user, machine, service, process, other entity, decrypted key, or multiple (e.g., groups) of one or more of the above. Each authorization may be encrypted by a key that may be decrypted by a key held by or created by the security principal. Public key/private key cryptography is one mechanism that may be used to encrypt/decrypt an authorization.

As a particular security principal may have many keys and there may be many authorizations in a security document, in one embodiment, an optimization provides a key hint that provides the first few bits (in plain text) of a key that may be used to decrypt the authorization. The key hint allows an entity to quickly determine which authorizations it should attempt to decrypt as the entity can simply compare the first few bits with its key. When there are hundreds or thousands of authorizations, the time savings provided by this mechanism may be substantial. Because a few bits (e.g., between 2 and 16) may be provided in the key hint, the strength of the mechanism used to encrypt/decrypt the authorizations may not be significantly weakened. If needed, the strength of the mechanism may be increased by using longer keys.

In one embodiment, an authorization includes encrypted keys that allow a security principal to perform one or more access rights with respect to a document version. For example, a user security principal may be given the rights to read the document, create new versions of the document, change which security principals may access the document, and perform any other security-related actions with respect to the document. Another user security principal may be given read-only or write-only access. Entities that are not given any rights with respect to a document may still have copy-only access (i.e., the ability to copy but not meaningfully read the encrypted data). Such entities may be used, for example, for archiving documents.

In another embodiment, the authorization may include an encrypted key that allows the security principle to decrypt additional keys elsewhere (e.g., in key(s) 450) of the security data structure 427. These additional keys may grant access rights to or other roles associated with the document to the security principal. This may be done, for example, to reduce the space needed for the security data structure 427 as a single key in an authorization may be used to decrypt multiple keys elsewhere in the security data structure 427. When a security data structure 427 includes hundreds or thousands of authorizations, many authorizations may share a common set of access rights. While the keys corresponding to these access rights may be included in the authorization itself, it may be more space efficient to provide a single key in each authorization that allows the security principals to decrypt the access keys elsewhere in the security data structure 427.

The usage options 445 may include one or more policies that relate to how documents are secured. For example, a policy may indicate that signatures be placed in just the security data structure, in just the document version data structure, in both, or that some signatures are to be duplicated in both data structures while other signatures are to be placed in just one of the data structures. A policy may indicate whether each version is to be signed by an observer. Under such a policy, a version that is not signed by an observer may be determined to be invalid, for example.

The keys 450 may include encrypted private keys as discussed previously that may correspond to access rights granted in the document. These keys may be decrypted by keys obtained in the authorization(s) field 440 as discussed previously. In addition, the keys may include published (i.e., not encrypted) public keys that may be used for validating whether a document version or security data structure was created by an authorized security principal.

The signature field 455 may be used in a similar fashion as the signature field 455 of the data structure 400.

The security data structure 427 may include more or fewer fields as long as it includes a mechanism for providing keys to access its associated document(s) to authorized users.

In one embodiment, the document version data structure 400 may include an identifier that identifies another document version data structure. The other document version data structure may include a key that allows access to the document. This mechanism may be used to provide group access to a document. For example, the authorizations in the security data structure associated with the first document version data structure may correspond to keys held by members of a group. Any member of the group who has an appropriate key may be able to obtain a member key from the security data that allows the member to access the second document according to rights granted to the group in the security data associated with the second document. Thus, accessing a document may involve accessing an intermediate document.

In another embodiment, the document version data structure 400 may omit a document identifier or another document altogether. In this embodiment, another mechanism may suggest that the keys in the first document's security data may provide access to the second document. For example, if the first document was known to provide group access to another document, the member key from the first document's security data may be tried on every authorization in the security data for every other document the user attempts to access. Key hints as described previously may speed this process.

Figure 5A:
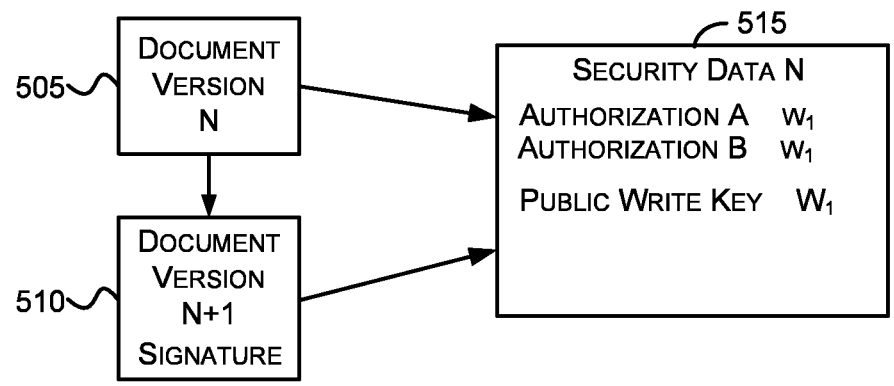
FIG. 5A is a block diagram that generally represents data that may change and actions that may occur in updating a document in accordance with aspects of the subject matter described herein.

FIG. 5A is a block diagram that generally represents data that may change and actions that may occur in updating a document in accordance with aspects of the subject matter described herein. In FIG. 5A, a document 505 of version N (where N is arbitrary) is updated to a document 510 having version N+1. The document 505 may be updated, for example, if a user changes the encrypted data or other data included in the document. In updating encrypted data of the document 505, a security principal may decrypt the encrypted data of the document, modify the decrypted data, encrypt the modified data, and create a new document version in which to store the encrypted data. In so doing, the security principal may sign the document using the private key $w_1$ encrypted in the security data 515 identified by the document 505. The security principal obtains the private key $w_1$ by decrypting it in the authorization using a key the security principal has or may create.

In one embodiment, the security principal signs the document 510 using the private key $w_1$ by computing a hash of the document 510 and then encrypting the hash with the private key $w_1$. An entity that desires to validate that the document 510 was signed by an authorized security principal may obtain a public write key $W_1$ from the security data 515, decrypt the signature of the security data 515 with the public write key $W_1$, compute the hash of the document 510, and compare the decrypted signature of the document 510 with the hash of the document 510. If the decrypted signature and the hash of the document 510 are the same, the security principal is assured that the document 510 was created by an entity having access to the private write key $w_1$.

If the security principal does not change the security principals that may create a new document version, the security principal may associate the new document 510 with the same security data 515 with which the old document 505 is associated. If the security principal changes the security principals that may create a new version of a document, the security principal may create new security data 520 and associate the new version of the document 530 with the new security data 520 as described in more detail in conjunction with FIG. 5B.

Figure 5B:
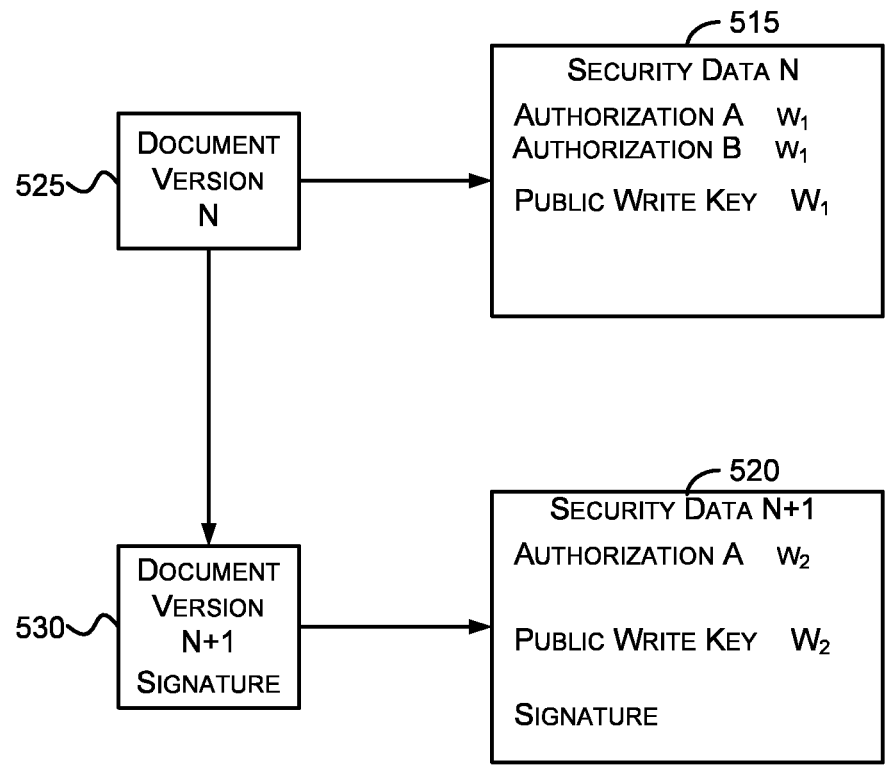
FIG. 5B is a block diagram that generally represents data that may change and actions that may occur in updating a document and updating the security principals that may create a new version of the document in accordance with aspects of the subject matter described herein.

FIG. 5B is a block diagram that generally represents data that may change and actions that may occur in updating a document and updating the security principals that may create a new version of the document in accordance with aspects of the subject matter described herein. A security principal authorized to create new versions may create new security data 520. The security principal may also create a new private write key $w_2$ and place it in the new security data 520 to change the security principals that are authorized to create new versions of the new document 530.

There are many cases when this type of action may be desired. For example, an employee may stop working for a company and the company may desire that the employee have no access to versions of documents created after the employee left the company. As another example, a group membership of a security principal having access to a document may change and it may be desired to provide access to new versions in accordance with the new group membership. As yet another example, a user may simply wish to stop allowing another user that has been granted access to a document to have access to subsequent versions of the document. In each of these cases and others, the actions described above and below in conjunction with FIG. 5B may occur to change access for subsequent versions of a document.

After creating a new private write key $w_2$ and placing it in the new security data 520, a security principal may sign the new security data 520 with the private write key $w_1$. This may be done to show that the security principal was authorized to make the change to the security data 515 that is reflected in the security data 520. A signature may be created, for example, by using the private write key $w_1$ to encrypt a hash of the data stored in the security data 520. The security principal may also create a new document 530 and associate it with the new security data 520. To indicate that the security principal had authority to create the new document 530, the security principal may sign the new document 530 with the private write key $w_1$ or, in another embodiment, the private write key $w_2$.

In one embodiment, to validate that a new version of a document (e.g., document 530) was created by an authorized security principal, a process may obtain the prior version of the document (e.g. document 525). With the prior version of the document, the process may then find the security data (e.g., security data 515) associated with the document.

In another embodiment, the new security data associated with a new document version may include an identifier that identifies the security data associated with a prior version. In this embodiment, there is no need to obtain the prior version of the document; rather, the new security data for a new document version may be used to locate the security data for the prior version.

The security data for the prior version includes the public write key $W_1$. With $W_1$ and the signature in the new security data, the process may verify that the new security data (e.g., the security data 520) was created by a user having authorization in the previous security data (e.g., the security data 515) to write. With $W_1$ (or $W_2$ in another embodiment) and the signature in the new document (e.g., the document 530), the process may verify that the new document was created by a user having authorization to write in the new security data.

Note that the new document 530 may or may not have its encrypted data changed when creating the new document 530. In one embodiment, for example, the only fields that are changed during creating the new document 530 are the security data identifier field and the signature field. In other embodiments, other fields of the security data including the encrypted data may be changed during creating the new document 530.

A security principal may have authorization to change other access rights when creating a new document version. For example, a security principal may have owner rights in a document and may be allowed to change the security principals and other entities that are associated with the document and how they are able to access the document. For example, the owner may change who may read a document or create new versions of the document. In addition, the owner may change the security principal that has namespace ownership (e.g., the security principal that can create new documents in a namespace). The owner may change the observer entity that can provide a signature that verifies when a document was changed. Other security roles associated with a document may also be changed by the owner without departing from the spirit or scope of aspects of the subject matter described herein.

An owner security principal may make these changes and sign the new document and security data with its private owner key in a manner similar to signing with the private write key as described above in conjunction with FIGS. 5A and 5B. Verifying that the owner made the changes may occur in a manner similar to the verification of changes made by a private write key as described above in conjunction with FIGS. 5A and 5B.

Other digital signature/validation mechanisms may also be used without departing from the spirit or scope of aspects of the subject matter described herein.

Figure 6:
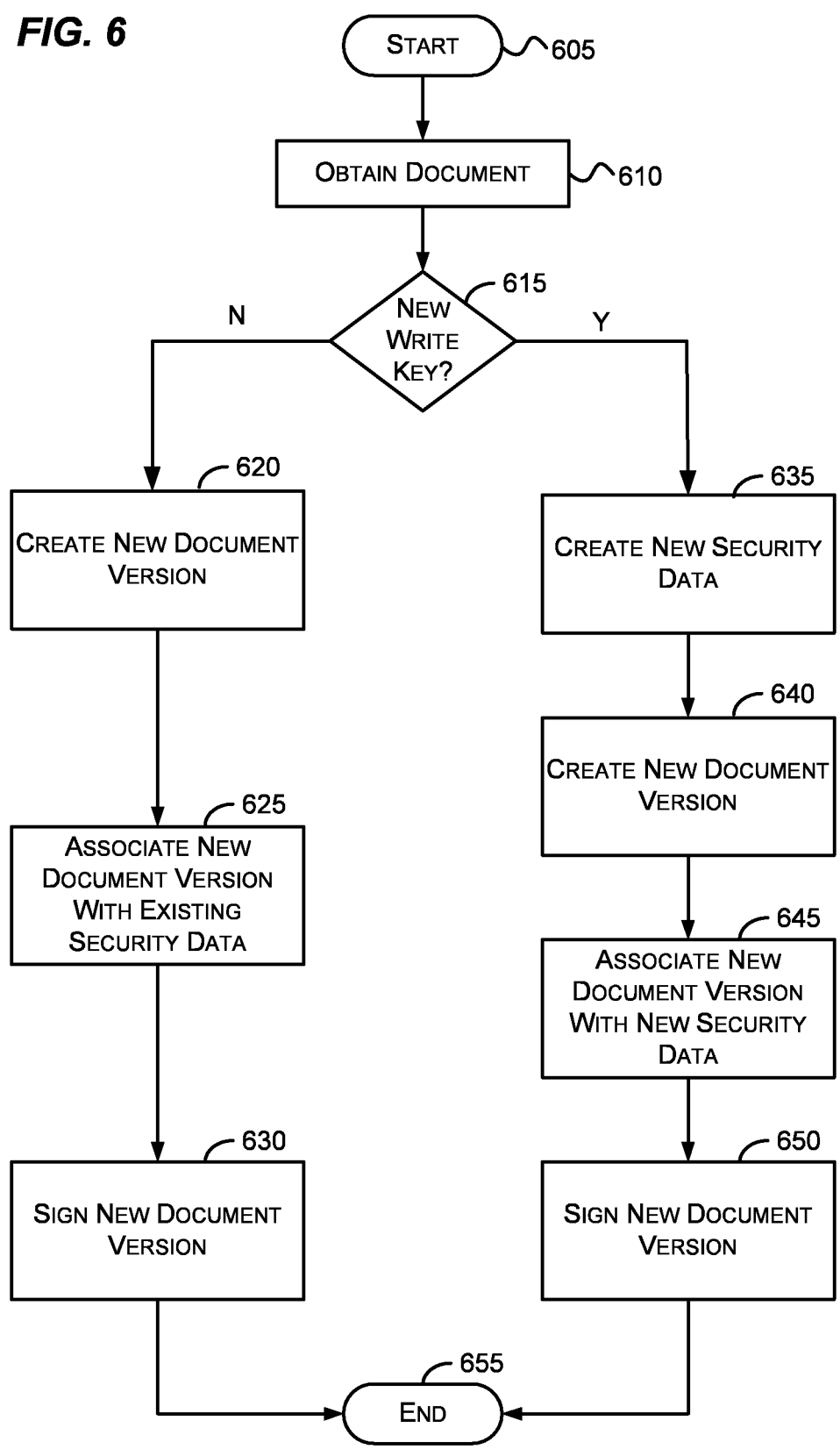
FIG. 6 is a flow diagram that generally represents exemplary actions that may occur in creating a new document version in accordance with aspects of the subject matter described herein.

FIG. 6 is a flow diagram that generally represents exemplary actions that may occur in creating a new document version in accordance with aspects of the subject matter described herein. At block 605, the actions begin.

At block 610, an entity obtains a document that it plans to update. For example, referring to FIG. 3, the updating/validating entity 305 obtains a document that is stored on the storage device 320.

At block 615, a determination is made as to whether a new write key will be used in updating the document. If so, the actions continue at block 635; otherwise, the actions continue at block 620. A new write key may be used when changing who may create subsequent versions of the document.

At block 620, a new version of the document is created. For example, referring to FIG. 3, the updating/validating entity 305 creates a new version of the document. As discussed previously, the new version may have the encrypted data changed thereon and/or may have other fields in the document changed.

At block 625, the new document version is associated with existing security data. For example, referring to FIGS. 4 and 5A, the security data identifier 410 in the new document version is filled with an identifier that identifies the security data 515.

At block 630, the new document version is signed. For example, referring to FIG. 3, the updating/validating entity 305 obtains its private write key from the security data associated with the prior document version and signs the new document version with this private write key.

At block 635, if a new write key was created, new security data is created. For example, referring to FIGS. 3 and 5B, the updating/validating entity 305 creates new security data 520.

At block 640, a new document version is created. For example, referring to FIGS. 3 and 5B, the updating/validating entity 305 creates a new document version 530.

At block 645, the new document version is associated with the new security data. For example, referring to FIGS. 3, 4, and 5B, the updating/validating entity 305 fills in the security data identifier 410 of the new document version to identify the security data 520.

At block 650, the new document version is signed in a manner similar to that described in conjunction with block 630. In addition, the new security data may also be signed.

Note, although not shown in FIG. 6 other signatures may also be obtained such as the observer signature and placed in the document and/or security data as described previously. Furthermore, an owner security principal may change access rights to and roles associated with a document as described previously.

At block 655, the actions end.

Figure 7:
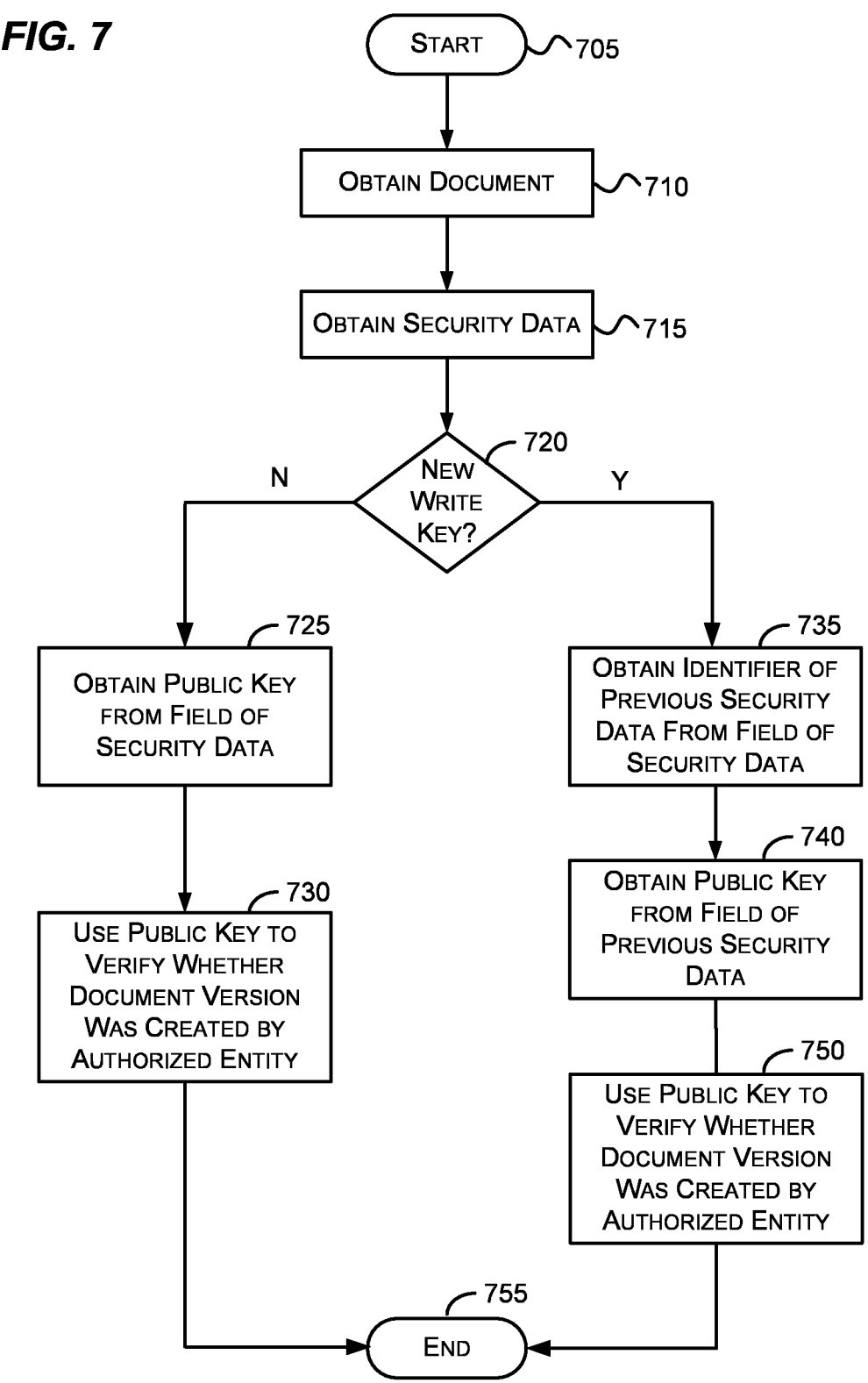
FIG. 7 is a flow diagram that generally represents exemplary actions that may occur in validating that a document version was created by an authorized security principal in accordance with aspects of the subject matter described herein.

FIG. 7 is a flow diagram that generally represents exemplary actions that may occur in validating that a document version was created by an authorized security principal in accordance with aspects of the subject matter described herein. At block 705, the actions begin.

At block 710, the document is obtained. For example, referring to FIG. 3, the updating/validating entity 305 may request and obtain a document which is retrieved from the storage device 320.

At block 715, the security data is obtained. If the security data is included in the document, it is retrieved from the document. If the security data is located elsewhere (such as a security data repository as shown in FIG. 3), it is obtained there.

At block 720, a determination is made as to whether a new write key was used when creating the document. If so, the actions continue at block 735; otherwise, the actions continue at block 725. As described previously, a new write key may be used to change the security principals that have access to the document.

At block 725, the public key is obtained from a field of the security data associated with the document. For example, referring to FIG. 4, a public write key may be obtained from the key(s) field 450.

At block 730, the public key is used to verify whether the document version was created by an authorized entity. This may be done as described previously, for example.

At block 735, when a new write key has been used to create the document, an identifier of the previous security data is obtained. For example, referring to FIGS. 3 and 4, the updating/validating entity 305 may obtain the security data identifier for a previous security data record from the prior security data identifier field 435.

At block 740, the public key is obtained from a field of the previous security data record. At block 750, this public key is used to verify whether the document version was created by an authorized entity in a manner similar to that described in conjunction with block 730.

At block 755, the actions end.

Figure 8:
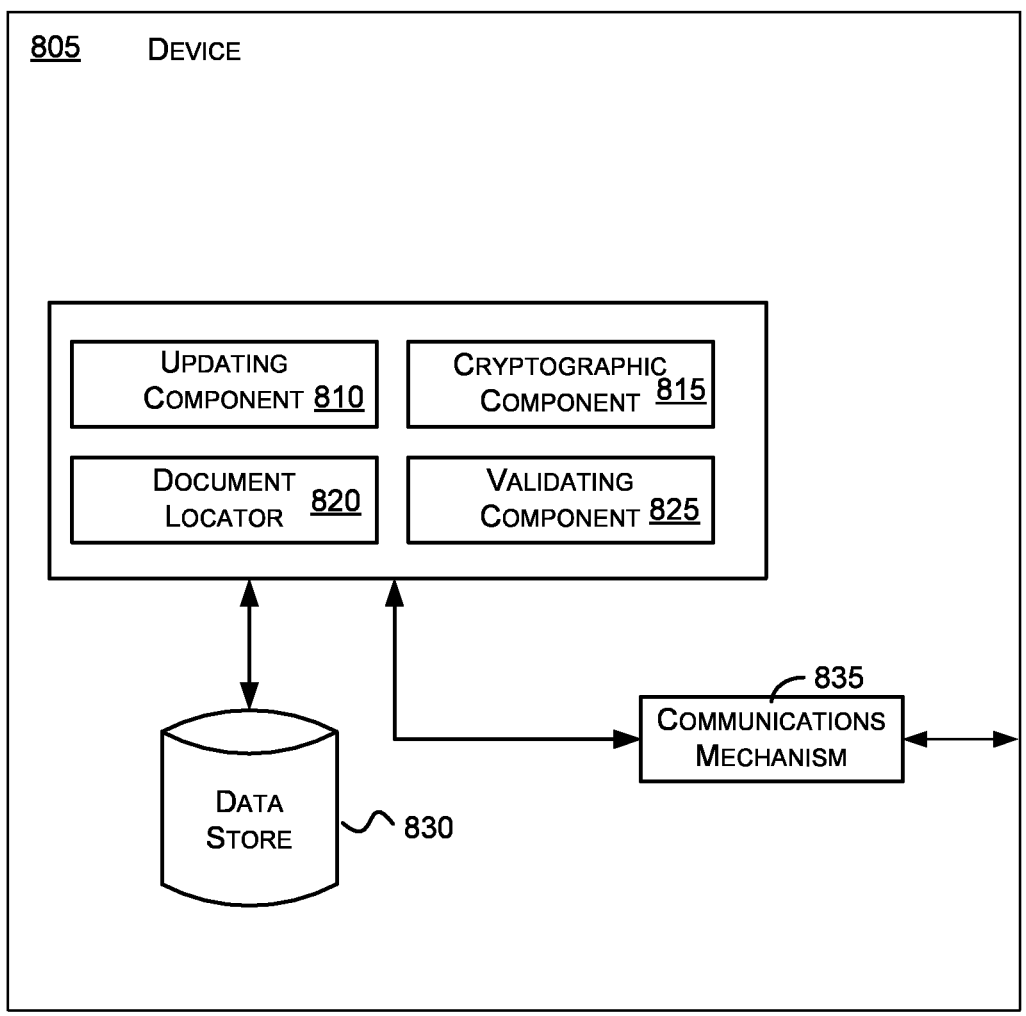
FIG. 8 is a block diagram that represents an exemplary device configured to operate in accordance with aspects of the subject matter described herein

FIG. 8 is a block diagram that represents an exemplary device configured to operate in accordance with aspects of the subject matter described herein. The device 805 may include an updating component 810, a cryptographic component 815, a document locator 820, a validating component 825, a data store 830, and a communications mechanism 835.

The updating component 810 represents the updating entity described previously. The cryptographic component 815 is used to encrypt and decrypt data and may comprise a library of cryptographic routines, for example.

The document locator 820 determines where the document is located which will either be on the local data store 830 or on some data store external to the device 805.

The validating component 825 represents the updating entity described previously and is involved in determining whether a document version was created by an authorized entity.

The communications mechanism 835 allows the device 805 to communicate with other devices to obtain documents and security data, for example. The communications mechanism 640 may be a network interface or adapter 170, modem 172, or any other means for establishing communications as described in conjunction with FIG. 1.

It will be recognized that other variations of the device 805 shown in FIG. 8 may be implemented without departing from the spirit or scope of aspects of the subject matter described herein. It will be recognized that more, fewer, or other components may exist on the device 805 without departing from the spirit or scope of aspects of the subject matter described herein.

As can be seen from the foregoing detailed description, aspects have been described related to updating and validating documents secured cryptographically. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer storage medium having computer-executable instructions, which when executed perform actions, comprising:
    accessing information of a new version of a document that includes encrypted data, the document including an identifier that identifies security data associated with the document, the security data including an encrypted field relating to an entity that is authorized to create a new version of the document, the encrypted field comprising an encrypted private write key, the security data further comprising a public write key that corresponds to the encrypted private write key;
    using a key held by the entity, decrypting the encrypted private write key to obtain a private write key; and
    using the security data to indicate that the new version of the document was created by the entity by signing the new version using the private write key.

2. The computer storage medium of claim 1, further comprising associating the new version of the document with the security data by placing the identifier in the new version of the document.

3. The computer storage medium of claim 1, further comprising changing an access right in conjunction with creating a new version of the document.

4. The computer storage medium of claim 3, wherein changing an access right in conjunction with creating a new version of the document comprises creating new security data and associating the new version of the document with the new security data by placing a new identifier that identifies the new security data in the new version of the document.

5. The computer storage medium of claim 4, wherein changing an access right in conjunction with creating a new version of the document further comprises placing an encrypted new private write key associated with the access right in the new security data, and, wherein using the security data to indicate that the new version was created by the entity by signing the new version using the private write key comprises signing using the new private write key.

6. The computer storage medium of claim 1, further comprising creating new security data and associating the new version of the document with the new security data by placing a new identifier that identifies the new security data in the new version of the document.

7. The computer storage medium of claim 1, wherein the identifier comprises a hash of one or more fields of data included in the security data.

8. The computer storage medium of claim 1, further comprising having another entity provide a signature to be placed in the new version of the document.

9. The computer storage medium of claim 8, wherein the signature provided by the other entity indicates that the new version of the document is to be replicated during file replication activities.

10. The computer storage medium of claim 1, further comprising using the public write key to determine whether the new version of the document was created by an authorized entity.

11. A method implemented at least in part by a computer, the method comprising:
    using a processing unit of the computer, accessing information of a document that identifies security data associated with the document, the document being an updated version of a previous version of the document, the security data including a field usable to determine whether the document was updated by an authorized entity; the security data further including an encrypted field comprising an encrypted private write key, the private write key used to sign the security data;
    obtaining data from the field; and
    using at least the data to determine whether the document was updated by the authorized entity, wherein the data from the field comprises a public write key that corresponds to the private write key used to sign the security data.

12. The method of claim 11, wherein the data from the field comprises an identifier that identifies a prior version of the security data.

13. The method of claim 12, wherein the public key is available from the prior version of the security data.

14. The method of claim 12, wherein the document includes encrypted data that was changed from the previous version of the document.

15. The method of claim 11, wherein the security data includes another field that includes a signature of an observer, the signature of the observer created by a private key corresponding to the observer, further comprising using the signature and a public key corresponding to the observer to determine whether the document was updated by an entity authorized to update the document at a time the document was updated.

16. In a computing environment, an apparatus, comprising:
a computer comprising:
a document locator operable to access a new version of a document that includes encrypted data, the document including data that identifies security data associated with the document, the security data including an encrypted field relating to an entity that is authorized to create a new version of the document, the encrypted field comprising a private write key;
a cryptographic component operable to perform cryptographic operations; and
an updating component operable to use the cryptographic component and the encrypted field to authenticate the new version of the document, wherein the updating component is further operable to use the cryptographic component to decrypt the private write key using a key held by the entity and to sign the new version of the document with the private write key.

17. The apparatus of claim 16, further comprising a validating component operable to determine whether a new version of a document was created by an authorized entity.

18. A method implemented at least in part by a computer, the method comprising:
accessing information of a new version of a document that includes encrypted data, the document including an identifier that identifies security data associated with the document, the security data including an encrypted field relating to an entity that is authorized to create a new version of the document, the encrypted field comprising an encrypted private write key, the security data further comprising a public write key that corresponds to the encrypted private write key;
using a key held by the entity, decrypting the encrypted private write key to obtain a private write key; and
using the security data to indicate that the new version of the document was created by the entity by signing the new version using the private write key.

19. The method of claim 18, further comprising changing an access right in conjunction with creating a new version of the document.

20. The method of claim 18, further comprising having another entity provide a signature to be placed in the new version of the document.

21. In a computing environment, an apparatus, comprising:
a computer comprising:
a document locator that accesses information of a new version of a document that includes encrypted data, the document including an identifier that identifies security data associated with the document, the security data including an encrypted field relating to an entity that is authorized to create a new version of the document, the encrypted field comprising an encrypted private write key, the security data further comprising a public write key that corresponds to the encrypted private write key;
a cryptographic component that, using a key held by the entity, decrypts the encrypted private write key to obtain a private write key; and
an updating component that uses the cryptographic component and the security data to indicate that the new version of the document was created by the entity by signing the new version using the private write key.

22. The apparatus of claim 21, wherein the updating component further changes an access right in conjunction with creating the new version of the document.

23. The apparatus of claim 21, wherein another entity provide a signature to be placed in the new version of the document.

24. A computer storage medium having computer-executable instructions, which when executed perform actions, comprising:
accessing information of a document that identifies security data associated with the document, the document being an updated version of a previous version of the document, the security data including a field usable to determine whether the document was updated by an authorized entity; the security data further including an encrypted field comprising an encrypted private write key, the private write key used to sign the security data;
obtaining data from the field; and
using at least the data to determine whether the document was updated by the authorized entity, wherein the data from the field comprises a public write key that corresponds to the private write key used to sign the security data.

25. The computer storage medium of claim 24, wherein the public key is available from the prior version of the security data.

26. The computer storage medium of claim 24, wherein the security data includes another field that includes a signature of an observer, the signature of the observer created by a private key corresponding to the observer, further comprising using the signature and a public key corresponding to the observer to determine whether the document was updated by an entity authorized to update the document at a time the document was updated.

27. In a computing environment, an apparatus, comprising:
a computer comprising:
a document locator that accesses information of a document that identifies security data associated with the document, the document being an updated version of a previous version of the document, the security data including a field usable to determine whether the document was updated by an authorized entity; the security data further including an encrypted field comprising an encrypted private write key, the private write key used to sign the security data;
a cryptographic component that obtains data from the field; and
a validating component that uses the cryptographic component and at least the data to determine whether the document was updated by the authorized entity, wherein the data from the field comprises a public write key that corresponds to the private write key used to sign the security data.

28. The apparatus of claim 27, wherein the public key is available from the prior version of the security data.

29. The apparatus of claim 27, wherein the security data includes another field that includes a signature of an observer, the signature of the observer created by a private key corresponding to the observer, the validating component further using the signature and a public key corresponding to the observer to determine whether the document was updated by an entity authorized to update the document at a time the document was updated.

30. A method implemented at least in part by a computer, the method comprising:

accessing a new version of a document that includes encrypted data, the document including data that identifies security data associated with the document, the security data including an encrypted field relating to an entity that is authorized to create a new version of the document, the encrypted field comprising a private write key;

authenticating the new version of the document using the encrypted field;

decrypting the private write key using a key held by the entity; and signing the new version of the document with the private write key.

31. The method of claim 30, further comprising determining whether a new version of a document was created by an authorized entity.

32. A computer storage medium having computer-executable instructions, which when executed perform actions, comprising:

accessing a new version of a document that includes encrypted data, the document including data that identifies security data associated with the document, the security data including an encrypted field relating to an entity that is authorized to create a new version of the document, the encrypted field comprising a private write key;

authenticating the new version of the document using the encrypted field;

decrypting the private write key using a key held by the entity; and signing the new version of the document with the private write key.

33. The computer storage medium of claim 32, further comprising determining whether a new version of a document was created by an authorized entity.

* * * * *